(12) United States Patent
Dahlin et al.

(10) Patent No.: US 12,546,762 B2
(45) Date of Patent: Feb. 10, 2026

(54) METHOD AND SYSTEM FOR EVALUATION OF DRUG CONCENTRATION IN BLOOD, PLASMA OR SERUM

(71) Applicant: PHARMACOLOG I UPPSALA AB, Uppsala (SE)

(72) Inventors: Hans Dahlin, Uppsala (SE); Jörgen Höjdmo, Uppsala (SE)

(73) Assignee: RAYSEARCH LABORATORIES AB (PUBL), Stockholm (SE)

( * ) Notice: Subject to any disclaimer, the term of this patent is extended or adjusted under 35 U.S.C. 154(b) by 1189 days.

(21) Appl. No.: 15/734,743

(22) PCT Filed: Jun. 3, 2019

(86) PCT No.: PCT/SE2019/050507
§ 371 (c)(1),
(2) Date: Dec. 3, 2020

(87) PCT Pub. No.: WO2019/235994
PCT Pub. Date: Dec. 12, 2019

(65) Prior Publication Data
US 2021/0239676 A1    Aug. 5, 2021

(30) Foreign Application Priority Data

Jun. 7, 2018    (SE) .................... 1850688-1

(51) Int. Cl.
*G01N 33/487*    (2006.01)
*A61M 5/172*    (2006.01)
*G01N 21/31*    (2006.01)

(52) U.S. Cl.
CPC ..... *G01N 33/48714* (2013.01); *A61M 5/1723* (2013.01); *G01N 21/31* (2013.01); *A61M 2205/3306* (2013.01)

(58) Field of Classification Search
CPC ............. G01N 33/48714; G01N 21/31; G01N 2800/52; A61M 5/1723; A61M 2205/3306; A61M 5/14; A61M 2205/50
See application file for complete search history.

(56) References Cited

U.S. PATENT DOCUMENTS

2004/0127778 A1*   7/2004   Lambert ................. G01N 21/65
                                                           600/318
2006/0084182 A1    4/2006   Farquharson et al.
(Continued)

FOREIGN PATENT DOCUMENTS

WO    2016/114761    7/2016

OTHER PUBLICATIONS

International Search Report for PCT/SE2019/050507 mailed Sep. 2, 2019, 3 pages.
(Continued)

*Primary Examiner* — John McGuirk
(74) *Attorney, Agent, or Firm* — NIXON & VANDERHYE

(57) ABSTRACT

A method and a system for evaluating a drug concentration in body fluid samples, wherein the body fluid samples are blood, plasma or serum, the method including the steps of: preparing at least one body fluid sample including a solved target drug by removing unsolved components from the body fluid sample; performing absorption spectrophotometric analyzes on the at least one body fluid sample; and evaluating a drug concentration in the at least one body fluid sample based on the spectrophotometric analyzes.

11 Claims, 3 Drawing Sheets

(56) References Cited

U.S. PATENT DOCUMENTS

| | | |
|---|---|---|
| 2012/0203089 A1 | 8/2012 | Rule et al. |
| 2012/0232362 A1* | 9/2012 | Gable ................ A61B 5/14532 600/310 |
| 2014/0114676 A1 | 4/2014 | Holmes |
| 2014/0349862 A1 | 11/2014 | Trieu |
| 2016/0003858 A1 | 1/2016 | McKendry et al. |

OTHER PUBLICATIONS

Written Opinion of the ISA for PCT/SE2019/050507 mailed Sep. 2, 2019, 7 pages.
Search Report for SE 1850688-1 dated Dec. 17, 2018, 4 pages.
Hassanain et al., "Towards interference free HPLCSERS for the trace analysis of drug metabolites in biological fluids", Journal of Pharmaceutical and Biomedical Analysis, 2017, vol. 136, pp. 38-43.
Subaihi et al., "Quantitative Online Liquid Chromatography—Surface-Enhanced Raman Scattering (LC-SERS) of Methotrexate and its Major Metabolites", Analytical Chemistry, 2017, vol. 89, pp. 6702-6709.
Sun et al., "Hierarchical zwitterionic modification of a SERS substrate enables real-time drug monitoring in blood pasma", Nature Communications, Nov. 11, 2016, vol. 7, 9 pages.

* cited by examiner

METHOD AND SYSTEM FOR EVALUATION OF DRUG CONCENTRATION IN BLOOD, PLASMA OR SERUM

This application is the U.S. national phase of International Application No. PCT/SE2019/050507 filed Jun. 3, 2019 which designated the U.S. and claims priority to SE Patent Application No. 1850688-1 filed Jun. 7, 2018, the entire contents of each of which are hereby incorporated by reference.

TECHNICAL FIELD OF THE INVENTION

The present invention relates to a method and a system for evaluating a drug concentration in body fluid samples. It relates also to a system and a method for administering of a drug to a patient.

BACKGROUND

Treatments of patients with different types of intravenous (IV) drugs are normally based on the patient's Body Surface derived from the weight and the length of the patient. The biological response of a given drug is dependent on many other factors than the Body Surface and therefore some treatments may not be correct and even cause the patient injuries.

If a drug is analyzed before or during treatment it is made at a centralized clinical laboratory. Very often the result from the analysis will take more than a day, which can cause severe patient injuries.

The term drug used throughout the description is intended to comprise both pharmaceuticals and biomolecules.

SUMMARY

An object of the invention is to provide an improved method and system for evaluating a drug concentration in a body fluid sample.

A further object of the invention is to provide a method and a system by which a drug concentration in a body fluid can be evaluated quickly and with precision.

A further object of the invention is to provide a system and a method for monitoring drug concentration changes in body fluid samples taken from a patient during treatment of the patient with said drug.

A further object of the invention is to provide a system and a method by which a dose of the drug to be administered to a patient can be adapted based on concentration changes of the drug in body fluid samples taken from the patient during treatment of the patient by the drug.

These objects are achieved by a method and a system according to the independent claims.

According to one aspect of the invention a method for evaluating a drug concentration in body fluid samples, wherein said body fluid samples are blood, plasma or serum, is provided. Said method comprises the steps of:
 preparing at least one body fluid sample comprising a solved target drug by removing unsolved components from the body fluid sample;
 performing absorption spectrophotometric analyzes on the at least one body fluid sample;
 evaluating a drug concentration in the at least one body fluid sample based on the spectrophotometric analyzes.

According to another aspect of the invention a system for evaluating a drug concentration in body fluid samples, wherein said body fluid samples are blood, plasma or serum, is provided. Said system comprises:
 a preparation unit, in which at least one body fluid sample comprising a solved target drug is prepared by removing unsolved components from the body fluid sample;
 an absorption spectrophotometer provided for receiving prepared body fluid samples from the preparation unit for performing absorption spectrophotometric analyzes on the at least one body fluid sample;
 an evaluation module connected to the spectrophotometer for receiving analyzes results therefrom and configured for evaluating a drug concentration in the at least one body fluid sample based on the spectrophotometric analyzes.

According to another aspect of the invention a method for administering of a drug to a patient is provided, said method comprising adapting a drug dose to be administered to the patient in accordance with an evaluation of a drug concentration in body fluid samples taken from the patient during the administration of the drug as described above. In one embodiment of the invention said adaptation of the drug dose and said evaluation of a drug concentration in a body fluid sample are done repeatedly during treatment of the patient with the drug.

According to another aspect of the invention a drug administering system is provided comprising:
 a drug administering device for administering a drug to a patient;
 a control unit connected to said drug administering device for controlling a dose of said drug being administered to the patient; and
 a system for evaluating a drug concentration in body fluid samples as described above,
 wherein said control unit is connected to said system for evaluating a drug concentration and is arranged to control a dose of said drug being administered to the patient from said drug administering device in accordance with said evaluated drug concentration.

In one embodiment of the invention a drug concentration is evaluated in at least two body fluid samples taken at different times during treatment of a patient with said drug and wherein the method further comprises the step of determining a change in drug concentration between the at least two body fluid samples by comparing the spectrophotometric analyzes for the different body fluid samples. Hereby a concentration change of the drug in the body fluid can be followed and a treatment of the patient with the drug can be adopted accordingly.

In one embodiment of the invention the method further comprises the step of monitoring drug concentration changes over time in a body fluid from a patient during treatment of said patient with said drug by evaluating a drug concentration in a number of body fluid samples taken at different times during treatment of a patient with said drug.

In one embodiment of the invention the step of preparing the at least one body fluid sample comprises removing lipids, blood cells and other unsolved components. Such unsolved components will disturb spectrophotometric analyzes. Spectrophotometric analyzes requires samples which are transparent, at least to some degree. The analyzes can be done with a better accuracy if unsolved components, for example blood cells and lipids, are removed at least to some degree.

In one embodiment of the invention the step of preparing the at least one body fluid sample comprises diluting the body fluid sample. The dilution can be performed by adding clean water or saline. By diluting the sample a larger volume of sample to work with is achieved. This is suitable both for the further preparation of the sample and for the spectrophotometric analyzes. Furthermore a collection of a fraction from the centrifuged sample is also facilitated and improved when the sample has been diluted. If for example a middle fraction is to be collected from the centrifuged sample it will be easier to assure that sample is only collected from the middle fraction if the volume is larger. Furthermore, when diluting the body fluid sample only a small volume of body fluid needs to be retrieved from the patient which is suitable for the patient especially if a large number of body fluid samples should be taken from the patient during a treatment.

In one embodiment of the invention the step of preparing at least one body fluid sample comprises:
  centrifuging the body fluid sample; and
  collecting a fraction from the centrifuged body fluid sample for further use in the spectrophotometric analyzes.

By centrifuging the sample heavy unsolved particles, such as blood cells, will be transferred to a bottom part of the sample and lighter unsolved particles, such as lipids, will be transferred to a top part of the sample. Thereafter a fraction of the sample can be collected for further use in the process. This can be a middle fraction provided between a top fraction comprising lighter unsolved particles and a bottom fraction comprising heavier unsolved particles.

In one embodiment of the invention the step of preparing the at least one body fluid sample comprises filtering the body fluid sample before performing the spectrophotometric analyzes. For example a bacteria filter can be used for removing remaining lipids in the sample.

In one embodiment of the invention the step of preparing at least one body fluid sample comprises:
  diluting the at least one body fluid sample;
  centrifuging the body fluid sample;
  collecting a middle fraction from the centrifuged body fluid sample;
  filtering said middle fraction through a bacteria filter for further use in the spectrophotometric analyzes.

In one embodiment of the invention said method is performed bed side, during treatment of a patient with the drug. Hereby quick analyzes can be performed of the body fluid samples and treatments can be directly adopted accordingly.

In one embodiment of the invention said drug is antibiotics or cytostatics.

In one embodiment of the invention the step of evaluating the drug concentration in the body fluid sample comprises comparing the spectrophotometric analyzes with pre-stored spectrophotometric spectra for this specific drug at different concentrations and with a patient reference spectra which is a spectrophotometric spectra for at least one body fluid sample from this specific patient taken at a start of a treatment of the patient. By retrieving, preparing and analyzing an initial body fluid sample from the patient before treatment of the patient with the drug is started or in the beginning of the treatment a spectra from this spectrophotometric analyze can be used for compensating for certain patient specific unsolved and solved components. This initial body fluid sample is suitably prepared by the same process as the other body fluid samples. Hereby a contribution from some patient specific components which were not removed during the preparation of the sample and which are affecting the spectrophotometry can be subtracted from the spectra. Furthermore by comparing spectrophotometric spectra from the body fluid sample with pre-stored spectra for different concentrations of the drug and by subtracting said patient reference spectra a reliable result for the drug concentration can be determined.

In one embodiment of the invention the preparation unit is configured for removing lipids, blood cells and other unsolved components.

In one embodiment of the invention said preparation unit comprises a dilution station for diluting said at least one body fluid sample.

In one embodiment of the invention said preparation unit further comprises:
  a centrifuging device arranged for centrifuging said at least one body fluid sample; and
  a fraction collection station arranged for allowing collection of a fraction of the centrifuged body fluid sample.

In one embodiment of the invention said preparation unit comprises a filter for filtering said at least one body fluid sample.

In one embodiment of the invention said preparation unit comprises:
  a dilution station for diluting said at least one body fluid sample;
  a centrifuging device connected to the dilution station and arranged for centrifuging said at least one diluted body fluid sample;
  a fraction collection station arranged for allowing collection of a middle fraction of the at least one centrifuged body fluid sample;
  a filter, which is a bacteria filter, connected to the fraction collection station and arranged for filtering said collected fraction of the at least one body fluid sample before transferring it to the spectrophotometer.

In one embodiment of the invention the evaluation module is arranged to compare the spectrophotometric analyzes with pre-stored spectrophotometric spectra for this specific drug at different concentrations and with a patient reference spectra which is a spectrophotometric spectra for at least one body fluid sample from this specific patient taken before a start of a treatment or in the beginning of a treatment of the patient.

DETAILED DESCRIPTION OF EMBODIMENTS

Figures 1A, 1B:
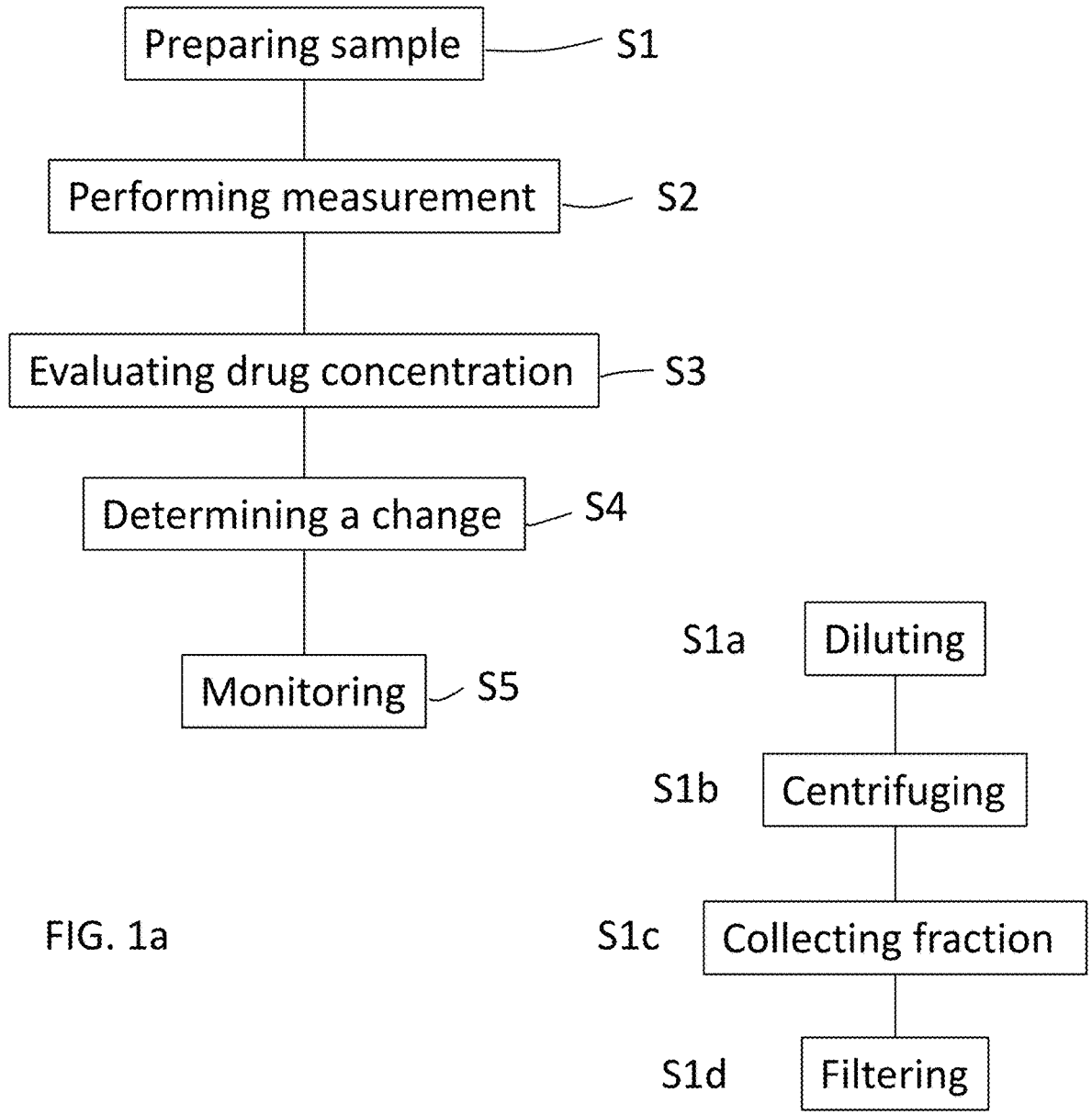
FIGS. 1a and 1b are flow charts of a method and parts of a method according to some embodiments of the invention.

According to one aspect of the invention a system and a method is provided for evaluating a drug concentration in body fluid samples. According to another aspect of the invention a system and a method for administering of a drug to a patient is provided. The method for evaluating a drug concentration in body fluid samples is described below in relation to FIGS. 1a and 1b. FIGS. 1a and 1b are flow charts of parts of the method according to some embodiments of the invention. The method comprises the steps of:

S1: Preparing at least one body fluid sample comprising a solved target drug by removing unsolved components. Unsolved components will block the light used for the spectrophotometry. Spectrophotometry requires samples which are transparent at least to some degree and by removing unsolved components from the sample a concentration of the drug can be evaluated with better precision. The body fluid sample is blood, plasma or serum. The preparation of the sample will serve to provide a sufficiently clear sample which is suitable for absorption spectrophotometric measurements. Hereby unsolved components in the sample which will affect a spectrophotometric analyze are removed. Such particles could be for example blood cells, lipids, droplets of lipids or organic cells. Different processes for removing those components are described in relation to FIG. 1*b* below.

S2: Performing absorption spectrophotometric analyzes on the at least one prepared body fluid sample. The preparation of the sample has provided a sample suitable for absorption spectrophotometric measurements. In one embodiment of the invention UV light with wavelengths between 200-800 nm is used. However other wavelengths and even IR could also be used. The response in these wavelengths regions of two types of drugs in different concentrations, one antibiotic (cefotaxim in plasma) and one cytostatic (Karboplatin in glucos), are shown in FIGS. 3*a* and 3*b* respectively. These type of spectrophotometric analyzes can be performed very quickly. By providing a sample preparation unit and a spectrophotometer together in a system a quick, easy and reliable system for drug concentration evaluation can be provided. This system is further described in relation to FIG. 2.

S3: Evaluating a drug concentration in the at least one body fluid sample based on the spectrophotometric analyzes. In one embodiment of the invention this evaluation comprises comparing the spectrophotometric analyzes with pre-stored spectrophotometric absorbance spectra for this specific drug at different concentrations. Furthermore a spectrophotometric absorbance spectra for an initial body fluid sample taken from this specific patient at a start of the treatment of the patient is used when evaluating the drug concentration. By subtracting a patient reference spectrophotometric spectra retrieved from analyzes of an initial body fluid sample, unsolved and solved patient specific components in the body fluid sample which affects the spectrophotometric analyzes can be subtracted from the result and hereby compensated for. Hereby a more accurate drug concentration can be evaluated. By retrieving, preparing and analyzing an initial body fluid sample from the patient before treatment of the patient with the drug is started or in the beginning of the treatment, a patient reference spectra from this spectrophotometric analyze can be used for compensating for certain patient specific unsolved and solved components. This initial body fluid sample is suitably prepared by the same process as the other body fluid samples. Hereby some patient specific components which were not removed during the preparation of the sample and which are affecting the spectrophotometry can be compensated for. Furthermore by comparing spectrophotometric spectra from the body fluid sample with pre-stored spectra for different concentrations of the drug and by subtracting said patient reference spectra a reliable result for the drug concentration can be determined.

The method as described in relation to steps S1-S3 provides a quick and reliable method for evaluating drug concentration in a body fluid sample. Such quick analyses are really important when treating some diseases.

According to some embodiments of the invention a drug concentration is evaluated in at least two body fluid samples taken at different times during treatment of a patient with said drug. Hereby the method further comprises the step of:

S4: Determining a change in drug concentration between the at least two body fluid samples by comparing the spectrophotometric analyzes for the different body fluid samples. Hereby a change in drug uptake for the patient can be followed. Different body fluid samples taken at different points in time during the treatment can be compared with regard to their drug concentration. Hereby a further treatment of the patient can be adapted accordingly.

Furthermore in some embodiments of the invention the method further comprises the step of:

S5: Monitoring drug concentration changes over time in a body fluid from a patient during treatment of said patient with said drug by evaluating a drug concentration in a number of body fluid samples taken at different times during treatment of a patient with said drug.

Said monitoring can be performed bed side, i.e. close to the patient and a drug administration can be adopted accordingly which will be further described below.

In relation to the flow chart of FIG. 1*b* the preparation of the sample is described in more detail. All four steps S1*a,b,c,d* as described in relation to FIG. 1*b* need not to be performed. One or more of the different steps could be enough and the different steps of the preparation process can be performed in a different order. According to one embodiment of the invention the preparation of the body fluid sample comprises the steps of:

S1*a*: Diluting the at least one body fluid sample. Dilution is performed by adding clean water or saline to the body fluid sample. By diluting the sample a larger volume of sample to work with is achieved. This is suitable both for the further preparation of the sample and for the spectrophotometric analyzes. Furthermore a collection of a fraction from the centrifuged sample is also facilitated and improved when the sample has been diluted. If for example a middle fraction is to be collected from the centrifuged sample it will be easier to assure that sample is only collected from the middle fraction if the volume is larger. Furthermore, when diluting the body fluid sample only a small volume of body fluid needs to be retrieved from the patient which is suitable for the patient especially if a large number of body fluid samples should be taken from the patient during a treatment. In one embodiment of the invention the body fluid sample is diluted by adding a volume of clean water or saline which is at least 50% of the body fluid sample volume. The step of diluting can however be omitted.

S1*b*: Centrifuging the body fluid sample. Hereby heavy unsolved components such as for example blood cells, platelets, heavy lipids or other cells will be separated and provided in a bottom fraction and lighter unsolved components, such as lipids will be separated into a top fraction of the sample. A middle fraction will comprise the solved drug. Most of the unsolved components will hereby be separated into either a bottom phase or a top phase. Hereby the middle fraction is suitable for use in the further measurements according to the invention. The middle fraction will comprise a very small amount of unsolved components.

S1*c*: Collecting a fraction from the centrifuged body fluid sample. Suitably the middle fraction is collected. This could for example be done by pipetting the middle fraction out from the sample. In one embodiment the whole top fraction is collected instead of the middle fraction.

S1*d*: Filtering said collected fraction of the centrifuged body fluid sample through a filter for further use in the spectrophotometric analyzes. The filter is suitably a fine filter, for example with pores of 0.2-0.22 µm, such as a bacteria filter. A bacteria filter will remove for example any remaining lipids.

In another embodiment of the invention the preparing of the body fluid sample comprises only the filtering step S1d, i.e. diluting, centrifuging and collection of fraction is not performed.

According to some embodiments of the invention the method is performed bed side, during treatment of a patient with the drug. Hereby quick analyzes can be performed and treatment can be adapted accordingly in a flexible way. The drug can be for example antibiotics or cytostatics.

According to another aspect of the invention a method for administering of a drug to a patient is provided. Said method comprises adapting a drug dose to be administered to the patient in accordance with an evaluation of a drug concentration in body fluid samples taken from the patient during the administration of the drug according to the method described above. Said adaptation of the drug dose and said evaluation of a drug concentration in a body fluid sample can be done repeatedly during treatment of the patient with the drug.

Figure 2:
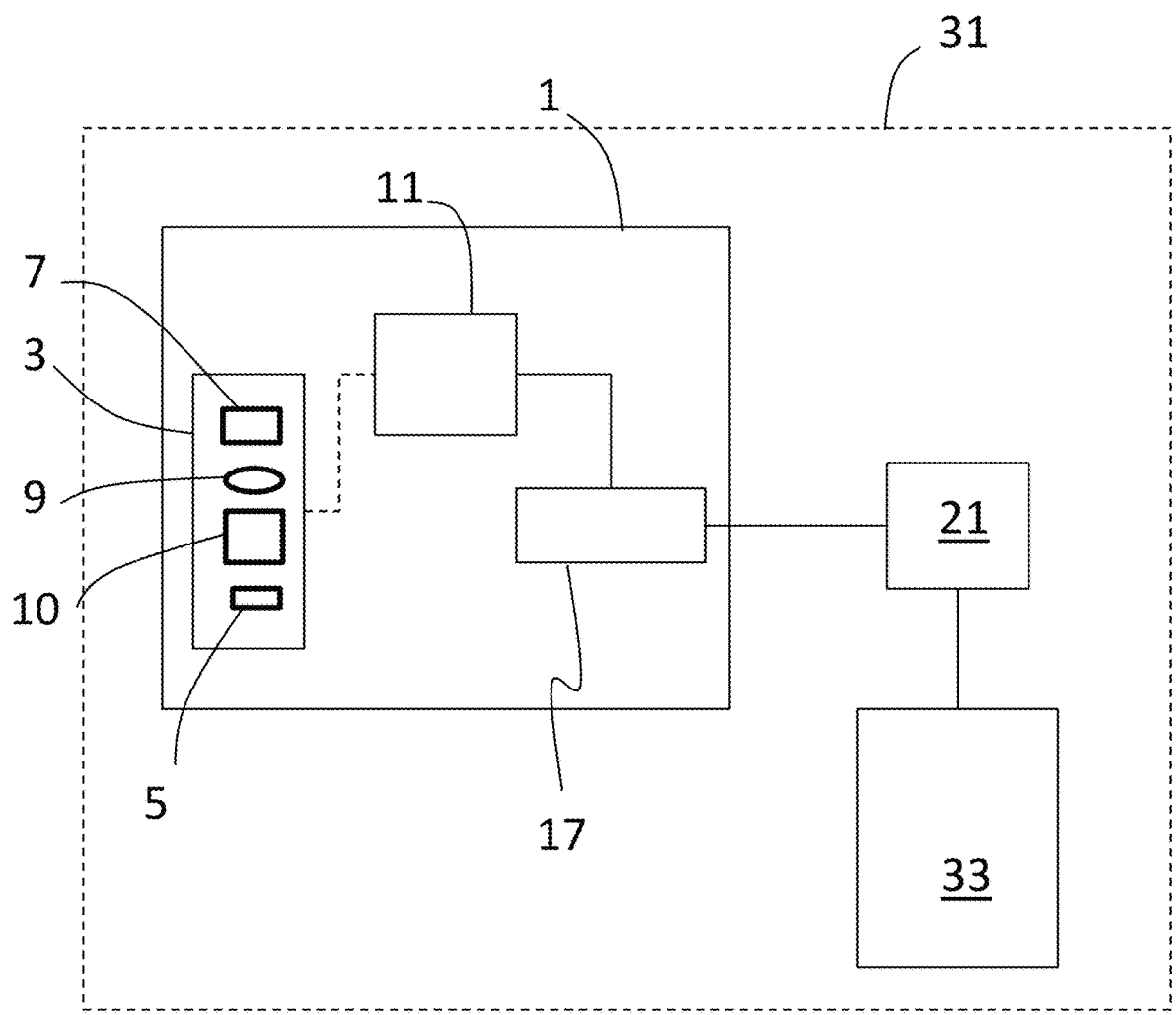
FIG. 2 is a schematic view of a system for evaluating a drug concentration according to some embodiments of the invention and a drug administering system according to some embodiments of the invention.
Figure 3A:
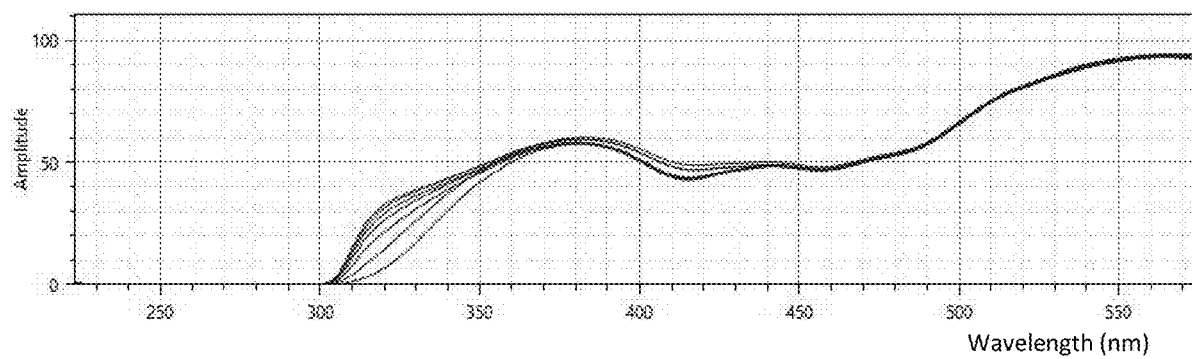
FIGS. 3a and 3b show spectra for one antibiotic and one cytostatic.
Figure 3B:
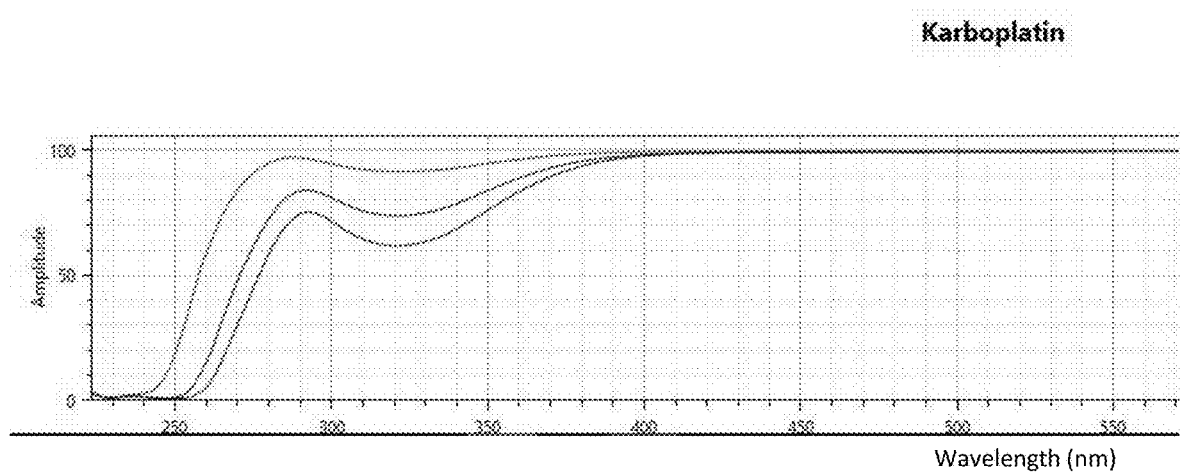

In FIG. 2 a system 1 for evaluating a drug concentration in body fluid samples according to some embodiments of the invention is shown schematically. The system comprises a preparation unit 3, in which at least one body fluid sample comprising a solved target drug is prepared by removing unsolved components. The preparation unit 3 is configured for removing for example lipids, blood cells and other unsolved components.

The preparation unit can comprise one or more of a dilution station 7, a centrifuging device 9, a fraction collection station 10 and a filter 5. Said components of the preparation unit can be provided separately and in any combination within the scope of this invention. The dilution station 7 is configured for allowing possibility to dilute said at least one body fluid sample. The sample can be diluted by for example clean water or saline. The centrifuging device 9 is arranged for centrifuging said at least one body fluid sample. The fraction collection station 10 is arranged for allowing collection of a fraction of the centrifuged body fluid sample. Said collection can for example be performed by pipetting and a middle fraction can suitable be collected as described above.

The filter 5 can be a bacteria filter and can be connected to the fraction collection station 10 if this is provided. The filter is arranged for filtering the sample or the collected fraction of the sample before transferring it to the spectrophotometer 11. For example lipids can be filtered out from the sample. In one embodiment of the invention the preparation unit 3 comprises only a filter 5.

The system 1 for evaluating a drug concentration in body fluid samples comprises furthermore a spectrophotometer 11 provided for receiving prepared body fluid samples from the preparation unit 3 for performing spectrophotometric analyzes on the at least one body fluid sample. The spectrophotometer is an absorption spectrophotometer. Suitable wavelengths have been discussed above. Furthermore the system 1 comprises an evaluation module 17 connected to the spectrophotometer 11 for receiving measurement results therefrom and configured for evaluating a drug concentration in the at least one body fluid sample based on the spectrophotometric analyzes. This system can provide quick and reliable measurements of drug concentration which is crucial when treating many diseases.

Spectrophotometric measurements can be performed very quickly and according to this invention a preparation unit 3 is provided in connection with a spectrophotometer 11 and an evaluation module 17 which will provide for a compact and reliable system which can be provided bed side. Measurements can be performed during treatment of the patient and drug concentration in body fluid samples can be compared between samples taken at different time points during treatment. The evaluation module 17 is in one embodiment arranged to compare the spectrophotometric analyzes with pre-stored spectrophotometric absorbance spectra for this specific drug at different concentrations and with a patient reference spectrophotometric spectra for an initial body fluid sample taken from this specific patient at a start of a treatment of the patient as described above.

According to another aspect of the invention a drug administering system 31 is provided. The drug administering system 31 is also shown schematically in FIG. 2. The drug administering system 31 comprises a drug administering device 33 for administering a drug to a patient, a control unit 21 connected to said drug administering device 33 for controlling a dose of said drug being administered to the patient and a system 1 for evaluating a drug concentration in body fluid samples as described above. The control unit 21 is connected to said system 1 for evaluating a drug concentration and is arranged to control a dose of said drug being administered to the patient from said drug administering device 33 in accordance with said evaluated drug concentration.

The invention claimed is:

1. A method for evaluating a pharmaceutical concentration in body fluid samples taken from a patient during treatment of the patient with the pharmaceutical, wherein the pharmaceutical comprises an antibiotic or cytostatic, and wherein said body fluid samples are blood, plasma or serum, said method comprising the steps of:
preparing at least one body fluid sample comprising the pharmaceutical in a solved state by
diluting the body fluid sample by adding a volume of clean water or saline which is at least 50% of the body fluid sample volume; and
removing unsolved components from the body fluid sample;
performing absorption spectrophotometric analysis on the at least one body fluid sample using UV-VIS light with wavelengths between 200-800 nm;
evaluating a concentration of the pharmaceutical in the at least one body fluid sample based on the spectrophotometric analysis, wherein the step of evaluating the concentration in the body fluid sample comprises comparing the spectrophotometric analysis with pre-stored spectrophotometric spectra for the pharmaceutical at different concentrations and with a patient reference spectra,
wherein the patient reference spectra is a spectrophotometric spectra for at least one body fluid sample from the patient taken before a start of the treatment or in the beginning of the treatment of the patient with the pharmaceutical.

2. The method according to claim 1, wherein a pharmaceutical concentration is evaluated in at least two body fluid samples taken at different times during treatment of a patient with said pharmaceutical and wherein the method further comprises the step of:
determining a change in pharmaceutical concentration between the at least two body fluid samples by comparing the spectrophotometric analysis for the different body fluid samples.

3. The method according to claim 1, further comprising the step of
monitoring pharmaceutical concentration changes over time in a body fluid from a patient during treatment of said patient with said pharmaceutical by evaluating a pharmaceutical concentration in a number of body fluid samples taken at different times during treatment of a patient with said pharmaceutical.

4. The method according to claim 1, wherein the step of preparing the at least one body fluid sample comprises removing lipids and blood cells.

5. The method according to claim 1, wherein the step of preparing at least one body fluid sample comprises:
   centrifuging the body fluid sample; and
   collecting a fraction from the centrifuged body fluid sample for further use in the spectrophotometric analysis.

6. The method according to claim 1, wherein the step of preparing the at least one body fluid sample comprises filtering the body fluid sample before performing the spectrophotometric analysis.

7. The method according to claim 1, wherein the step of preparing at least one body fluid sample comprises:
   diluting the at least one body fluid sample;
   centrifuging the body fluid sample;
   collecting a middle fraction from the centrifuged body fluid sample;
   filtering said middle fraction through a bacteria filter (5) for further use in the spectrophotometric analysis.

8. The method according to claim 1, wherein said method is performed bed side, during treatment of a patient with the pharmaceutical.

9. A method for administering of a pharmaceutical to a patient comprising:
   adapting a pharmaceutical dose to be administered to the patient in accordance with an evaluation of a pharmaceutical concentration in body fluid samples taken from the patient during the administration of the pharmaceutical according to claim 1.

10. The method according to claim 9, wherein said adaptation of the pharmaceutical dose and said evaluation of a pharmaceutical concentration in a body fluid sample are done repeatedly during treatment of the patient with the pharmaceutical.

11. The method of claim 1, wherein the antibiotic is cefotaxim and the cytostatic is carboplatin.

* * * * *